United States Patent
Cox et al.

(10) Patent No.: US 12,358,491 B2
(45) Date of Patent: Jul. 15, 2025

(54) SYSTEMS AND METHODS FOR CONDITIONING A BATTERY

(71) Applicant: Ford Global Technologies, LLC, Dearborn, MI (US)

(72) Inventors: David Cox, London (GB); Bastian Hartman, Hurth (DE); Martin England, Chelmsford (GB); Kai Scholz-Starke, Nordrhein-Westfalen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 209 days.

(21) Appl. No.: 17/993,475

(22) Filed: Nov. 23, 2022

(65) Prior Publication Data

US 2024/0166190 A1    May 23, 2024

(51) Int. Cl.
| | | |
|---|---|---|
| *B60W 20/10* | (2016.01) | |
| *B60W 30/18* | (2012.01) | |
| *B60W 50/00* | (2006.01) | |
| *H01M 10/42* | (2006.01) | |

(52) U.S. Cl.
CPC ...... *B60W 20/10* (2013.01); *B60W 30/18127* (2013.01); *B60W 50/0097* (2013.01); *H01M 10/425* (2013.01); *B60W 2510/18* (2013.01); *B60W 2510/244* (2013.01); *B60W 2510/248* (2013.01); *B60W 2555/20* (2020.02); *B60W 2555/60* (2020.02); *B60W 2556/10* (2020.02); *H01M 2010/4271* (2013.01); *H01M 2220/20* (2013.01)

(58) Field of Classification Search
CPC .......... B60W 20/10; B60W 30/18127; B60W 50/0097; H01M 10/425
See application file for complete search history.

(56) References Cited

U.S. PATENT DOCUMENTS

| | | | |
|---|---|---|---|
| 8,217,620 B2 | 7/2012 | Hanssen et al. | |
| 8,244,421 B2 | 8/2012 | Aoki et al. | |
| 11,066,976 B2 | 7/2021 | Kurtz et al. | |
| 11,545,831 B1* | 1/2023 | Molchadsky | H02J 3/32 |
| 2010/0188043 A1* | 7/2010 | Kelty | B60L 58/16 320/109 |
| 2014/0288832 A1* | 9/2014 | Hoch | G01C 21/3469 701/538 |
| 2016/0172899 A1* | 6/2016 | Taniguchi | H02J 7/35 320/101 |
| 2016/0290308 A1 | 10/2016 | Szczepanski | |
| 2017/0088072 A1* | 3/2017 | Curtis | G08B 31/00 |
| 2020/0164763 A1* | 5/2020 | Holme | B60L 58/16 |
| 2020/0198495 A1 | 6/2020 | Rizzoni et al. | |

* cited by examiner

*Primary Examiner* — Seth A Silverman
(74) *Attorney, Agent, or Firm* — Haley Guiliano LLP

(57) ABSTRACT

Methods and system are provided to select a battery control strategy for a hybrid battery of a hybrid electric vehicle. The methods comprise receiving forecast weather information at a first location, determining an operational parameter of the hybrid battery, and selecting a first battery control strategy based on the forecast weather information and the operational parameter of the hybrid battery, wherein the control strategy comprises a state of charge target for the hybrid battery required for a next start sequence.

17 Claims, 9 Drawing Sheets

BOL production battery conditioning for a forecast temperature of -10°C

EOL production battery conditioning for a forecast temperature of -10°C

If the navigation is programmed and the remaining trip distance is above threshold HEV functions are prioritised Start sequence energy reserves of a limited capability current production battery Start sequence energy reserves of a non-limited capability current production battery

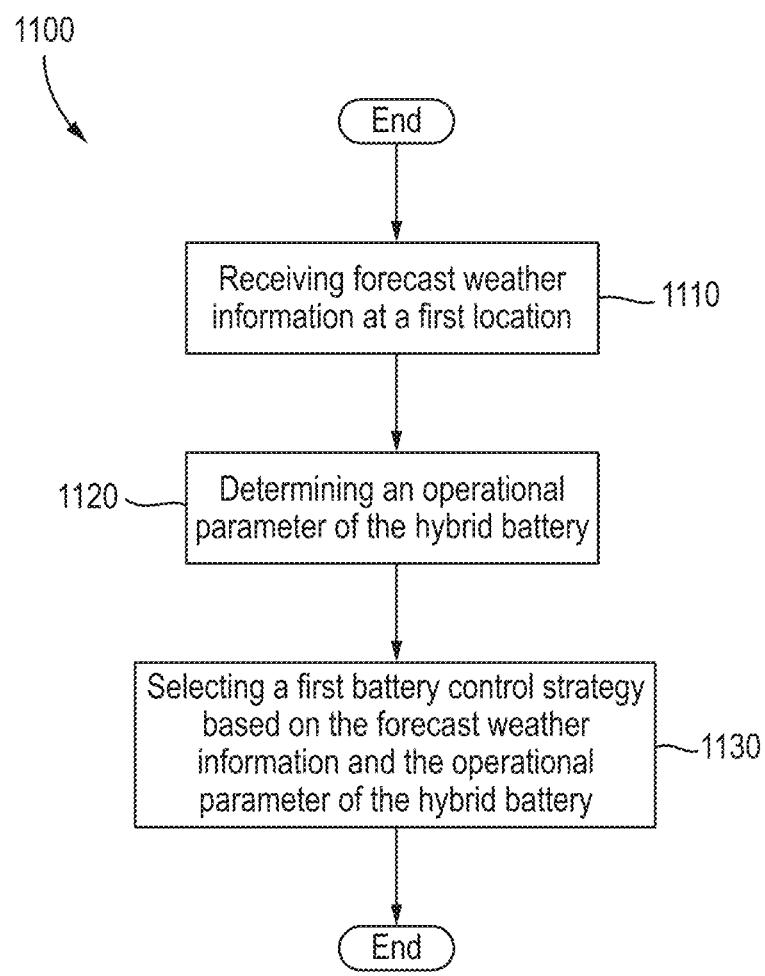

SYSTEMS AND METHODS FOR CONDITIONING A BATTERY

FIELD OF INVENTION

The present disclosure relates to systems and methods for battery conditioning, more particularly, but not exclusively, to systems and methods for battery conditioning strategies based on forecast data for a battery used to support an after-treatment system of a hybrid vehicle to progress hybrid battery durability.

BACKGROUND

Through consumer demand and local guidelines, the need for reduced engine emissions has led to engine exhaust systems that comprise electric exhaust gas heaters (eEGH). Indeed, eEGHs are now being standardized, owing to there predicted essentiality in meeting guidelines. In particular, standards will require an operational range in a temperature soak of −10° C. to 45° C., and therefore eEGHs will be required at both ends of this range to meet eEGHs operating temperature of ~250° C. For example, catalytic converters are a specific type of engine after-treatment system that reduces pollutants in exhaust gases by catalyzing a redox reaction. Catalytic converters are located downstream of the engine within a structure/housing in the exhaust system, that is designed to contain and direct exhaust gases over and/or through the catalytic converter. Like many after-treatment systems, catalytic converters require heating up to be the most effective. If the ambient temperature of a vehicle is at the lower end of the temperature soak range, −10° C., then the catalytic converter will require more energy from an eEGH to get to the operating temperature. Thus, battery conditioning and energy management control strategies will be pivotal in not only meeting guidelines, but also user expectations and experience. As the demand for cleaner emissions increases and legislation requires a reduction in the pollutants produced by internal combustion engines, solutions involving exhaust after-treatment systems are becoming increasingly desired.

Not all high voltage (for example, but not limited to, 48V) production batteries, and in particular their control methodologies, satisfy the soon-to-be required legislation, such as EU7. For example, the gasoline vehicle start sequence under EU7 will be a new use of the high voltage battery, which comprises discharging to support eEGH at key on, e-machine torque supplementation or substitution (TS) during initial driving and recharge in all conditions, in particular low-temperature conditions. At present, it is not feasible, due to expense, packaging limitations, and lead time, to create and develop new 48V batteries to meet the demands of the new standards in a timely manner. Therefore, it is desirable to have a methodology of control that utilizes the current 48V production batteries to meet the full requirements of legislation, such as EU7.

Accordingly, there is a need for eEGHs to meet emissions targets for various types of hybrid electric vehicles, in particular before battery technology satisfies the requirements. Without a proper control strategy, hybrid electric vehicle functions will be lost, the driver will experience wait periods and derated torque; certainly, after some trips, the engine will need to "run-on" to add additional battery charge. It may also be desirable, to meet emissions targets, that a vehicle may also require assistive braking from an e-machine; another energy consumption modality that should be considered.

By way of summary, some problems to be solved by the present disclosure include: enabling current production high voltage (e.g., 48V) batteries to satisfy Gasoline EU7 start sequence requirements in all conditions, because these batteries are already deployed and satisfy vehicle package constraints; time, research and development to develop a new, more capable battery is lagging so a more immediate solution is required; present HEV control strategies do not reserve energy content or comprise a strategy to condition the battery to satisfy the next start sequence (e.g., EU7 start sequence); the battery discharge capability is dominated by three interconnected factors, cell temperature, state of charge (SOC) and battery age.

SUMMARY

A method to enable ambient temperature data to be available to facilitate a decision or action. In particular, a suspected cold start (e.g., battery cell temperature of −10° C. to 0° C.) will have a different state of charge control strategy to a suspected warm (e.g., cell temperature >5° C.) start. To mitigate reduced battery capability as a consequence of colder cell temperatures, weather forecast data based on location and navigation system inputs will determine the choice of mode. Without the proposed solution a blanket approach is likely to be adopted for all drivers, even if the battery is not limited, to protect the worst-case battery capability in all scenarios to satisfy EU7 tailpipe requirements at the next start. The proposed solution seeks to prevent a restriction of HEV functions (i.e., but not limited to, ICE, internal combustion engine, stop/start, regenerative braking, torque supplementation and torque boost) for all customers, increased exposure to ICE 'run on' (SOC high target) and additional battery ageing (residency at SOC high). The proposed solution intends to only reserve the entire useable energy capacity for the EU7 tailpipe emissions when it is necessary, to enable battery capacity to support HEV functions and perhaps additional EU7 tailpipe start sequences. Put another way, approximately 15% of European users experience the "worst case" but most methodologies make all vehicles prepare for a worst-case start, at the sacrifice of HEV functionality.

According to a first example of the present disclosure, there is provided a method of selecting a battery control strategy for a hybrid battery of a hybrid electric vehicle, the method comprising: receiving forecast weather information at a first location; determining an operational parameter of the hybrid battery, and selecting a first battery control strategy based on the forecast weather information and the operational parameter of the hybrid battery, wherein the control strategy comprises a state of charge target for the hybrid battery required for a next start sequence.

In some examples, determining the operation parameter of the hybrid battery comprises: determining if the forecast weather information is in a cold start weather range, and determining if the battery state of the heath is less than a predetermined threshold. In some examples, the cold start weather range is from −10° C. to 0° C. In some examples, the battery state of health threshold is 65%.

In some examples, the operational parameter is the battery state of health data. In some examples, the first location is the current location of the vehicle. In some examples, the first location is a future location of the vehicle, based on navigation data or historic trip data.

In some examples, the method further comprises: assigning a priority score for a plurality of hybrid vehicle functions based on the forecast weather information; and selecting a second battery control strategy based on the hybrid vehicle function with the highest priority, the second battery control strategy to be used when the state of charge target of the first battery control strategy has been reached. In some examples, after a hybrid vehicle function has been used, the assigned priority scores are updated.

In some examples, the method further comprises: determining if a vehicle navigation system has been programmed for a trip, and determining if the remaining trip distance is greater than a first threshold. In some examples, the first threshold is the distance required to charge the battery to enable one or more hybrid vehicle functions. In some examples, the method further comprises predicting hybrid electric vehicle function usage data for a current trip. In some examples, the prediction is based on one or more of: vehicle data; navigation data; GPS data; ADAS; traffic sign recognition; cruise control system; driver inputs; or historic route information. In some examples, the method further comprises determining if the battery capability is likely to be limited at the next start; harvesting energy for the remaining trip distance to enable one or more start sequences based on the determination of battery capability.

In some examples, the operational parameter comprises at least one of: current ambient temperatures; a state of charge of the hybrid battery of the vehicle; a time since a last engine start-up; battery age data; further weather forecast data; navigation data; or a delta temperature between the temperature of the after-treatment system and the ambient temperature.

In some examples, the method further comprises updating the first battery control strategy with an over-the-air update.

In some examples, the method further comprises: detecting a regenerative braking event; harvesting energy from the regenerative braking event; and after the regenerative braking event, selecting a new battery control strategy based on the amount of harvested energy from the regenerative braking event.

In some examples, at least one of a plurality of heating elements of a heating module is selectively operated to provide heat to a catalyst; wherein the catalyst is heated to a threshold temperature based on the operational parameter; and after the catalyst reaches a threshold temperature, starting an engine of the hybrid vehicle.

According to a second example of the present disclosure, there is provided a vehicle comprising a hybrid battery electrically connected to a hybrid engine, the battery and engine communicatively coupled to a controller, the controller configured to: receive forecast weather information at a first location; determine an operational parameter of the hybrid battery; and select a first battery control strategy based on the forecast weather information and the operational parameter of the hybrid battery, wherein the control strategy comprises a state of charge target for the hybrid battery required for a next start sequence.

According to a third example of the present disclosure a non-transitory computer-readable medium having instructions encoded thereon for carrying a method of selecting a battery control strategy for a hybrid battery of a hybrid electric vehicle, the method comprising: receiving forecast weather information at a first location; determining an operational parameter of the hybrid battery; and selecting a first battery control strategy based on the forecast weather information and the operational parameter of the hybrid battery, wherein the control strategy comprises a state of charge target for the hybrid battery required for a next start sequence.

Accordingly, it will be clear to the skilled person in the art that the present disclosure has the flexibility to support tailpipe emissions requirements, brakes emissions requirements, and general HEV functions, which would not be possible by always prioritizing worst-case scenarios over user-specific scenarios. In addition, investment and research and development resources are minimized as the already deployed vehicle batteries can be retroactively updated with the disclosed control strategies, for example, via over-the-air updates. Moreover, start sequence robustness is enhanced while minimizing battery energy throughput, prolonging the life of hybrid batteries. Furthermore, engine "run-on" time after short trips is reduced or obviated.

For the avoidance of doubt, the system and methods for providing heat to a catalyst of an after-treatment system for a vehicle, according to any of the examples described herein, may be used to recover the emissions of a vehicle. Whilst the benefits of the systems and method may be described by reference to gasoline or diesel-based hybrid vehicles, it is understood that the benefits of the present disclosure are not limited to such types of vehicle, and may also apply to other types of vehicles, such as forklifts, trucks, buses, locomotives, motorcycles, aircraft and watercraft, and/or non-vehicle based systems that utilize an electric exhaust gas heater comprising catalytic converters, such as electrical generators, mining equipment, stoves, and gas heaters.

These examples and other aspects of the disclosure will be apparent and elucidated with reference to the example(s) described hereinafter. It should also be appreciated that particular combinations of the various examples and features described above and below are often illustrative and any other possible combination of such examples and features is also intended, notwithstanding those combinations that are clearly intended as mutually exclusive.

BRIEF DESCRIPTION OF THE DRAWINGS

The above and other objects and advantages of the disclosures herein will be apparent upon consideration of the following detailed description, taken in conjunction with the accompanying drawings, in which:

FIG. 11 illustrates an example flow chart of a method for selecting a battery control strategy, in accordance with at least one of the examples described herein.

DETAILED DESCRIPTION

Figure 1:
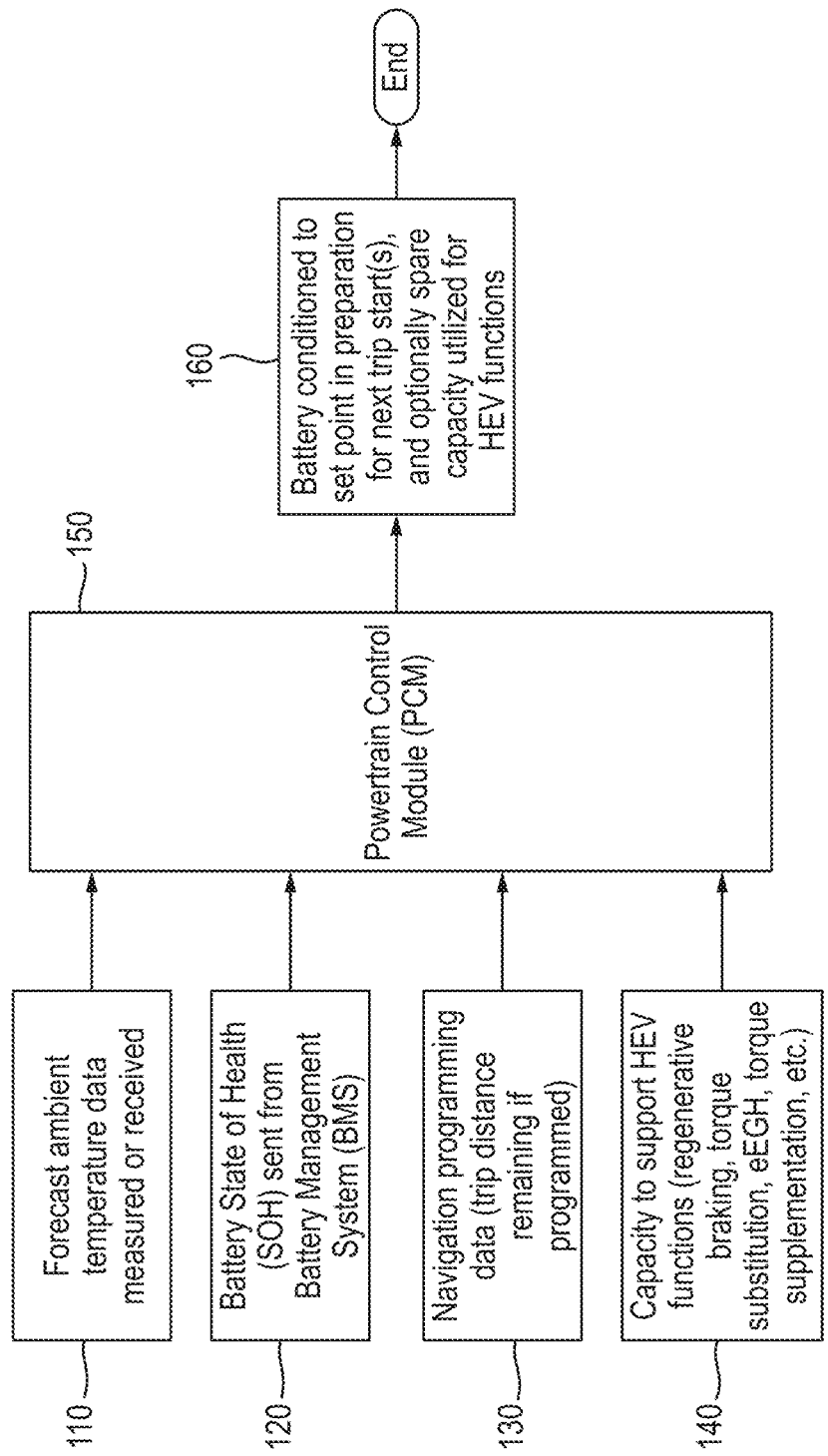
FIG. 1 illustrates a data flow to a powertrain control module to create battery condition set points, in accordance with at least one of the examples described herein.

It should be understood that the detailed description and specific examples herein while indicating exemplary embodiments, are intended for purposes of illustration only and are not intended to limit the scope of the disclosure. These and other features, aspects, and advantages of the present disclosure will become better understood from the following description, appended claims, and accompanying drawings. It should be understood that the Figures are merely schematic and are not drawn to scale. It should also be understood that the same or similar reference numerals are used throughout the Figures to indicate the same or similar parts.

As discussed briefly above, current targets on emissions standards are requiring manufacturers of internal combustion engines to reduce the operating emissions from the engines they manufacture. These engines are used in any appropriate type of vehicle, such as an automobile, a motor-bike, a marine vessel, or an aircraft. In particular, the vehicle may be any appropriate type of hybrid vehicle, such as a Hybrid Electric Vehicle (HEV), a Plug-in Hybrid Electric Vehicle (PHEV), a Mild Hybrid Electric Vehicle (mHEV), or any other vehicle having an engine and an electrified powertrain. Typically, hybrid vehicles use two or more distinct types of means to store energy, such as batteries to store electrical energy and gasoline/diesel to store chemical energy. The basic principle of hybrid vehicles is that the different types of motors have diverse efficiencies under different conditions, such as top speed ro torque and therefore switching from one type of motor to another yields greater efficiencies than either one could have their own. However, under the proposed new emissions standards in markets such as the European Union (EU), North America, and the United Kingdom (UK), the increased efficiencies of hybrid vehicles may be insufficient to satisfy new emission standards.

One solution to reduce the emissions of vehicles is the use of an exhaust after-treatment system. Exhaust after-treatment systems aim to reduce hydrocarbons, carbon monoxide, nitrous oxide, particulate matter, sulfur oxide, and volatile organic compounds such as chlorofluorocarbons. Examples of exhaust after-treatment systems include air injection (or secondary air injection), exhaust gas recirculation, and catalytic converters.

Electronic Exhaust Gas Heaters, eEGHs, are a type of aftertreatment system that has been in use for a number of years. An eEGH typically comprises a heating element disposed within, or near to, a catalyst. eEGHs are required in various use cases and will demand a power supply, for example, between 0-4 kW (0 to 4000 Watts), depending on the use case. For example, the heating elements within the eEGHs will have a thermal output of 0-4 kW (0 to 4000 Watts). An eEGH typically has low inductance and therefore the power consumption can be changed rapidly. The eEGH demand is supported by a hybrid powertrain electrical system in an HEV, mHEV, or PHEV platform. For example, in a cold start use case, the eEGH will require its full rated power (e.g., ~4 kW) to maintain aftertreatment temperature and the PCM will demand this from the HEV system. This load will be supported by the hybrid battery transiently until the e-machine can respond to support the load. However, in some use cases in which the e-machine can't support the total demand, the battery will need to support the eEGH power supply. This can lead to issues with HEV functionality, such as torque substitution/torque supplementation, wherein the e-machine of the vehicle aids the engine by delivering a substantial amount of torque in addition to the engine (supplementation) or instead of the engine (substitution).

For example, as mentioned above, the gasoline vehicle start sequence under EU7 will be a new use of the high voltage battery, which comprises discharging to support eEGH at key on, e-machine torque supplementation or substitution (TS) during initial driving and recharge in all conditions, in particular low-temperature conditions. At present, it is not feasible, due to expense, packaging limitations, and lead time, to create and develop new 48V batteries to meet the demands of the new standards in a timely manner. Therefore, it is desirable to have a methodology of control that utilizes the current 48V production batteries to meet the full requirements of legislation, such as EU7.

Accordingly, there is a need for eEGHs to meet emissions targets for various types of hybrid electric vehicles, in particular before battery technology satisfies the requirements to the requirements. Without a proper control strategy, hybrid electric vehicle functions will be lost, the driver will experience wait periods and derated torque; certainly, after some trips, the engine will need to "run-on" to add additional battery charge. It may also be desirable, to meet emissions targets, that a vehicle may also require assistive braking from an e-machine; another energy consumption modality that should be considered.

By way of summary, some problems to be solved by the present disclosure include: enabling current production high voltage (e.g., 48V) batteries to satisfy Gasoline EU7 start sequence requirements in all conditions, because these batteries are already deployed and satisfy vehicle package constraints; time, research and development to develop a new, more capable battery is lagging so a more immediate solution is required; present HEV control strategies do not reserve energy content or comprise a strategy to condition the battery to satisfy the next start sequence; the battery discharge capability is dominated by three interconnected factors, cell temperature, state of charge (SOC) and battery age.

In more detail, when considering that the battery discharge capability is dominated by three interconnected factors, cell temperature, state of charge (SOC) and battery age; an initial strategy may be to reserve the entire usable capacity of the small production battery to protect against the possibility of the 'worst case' start sequence, i.e. when the battery is aged and/or cold (i.e., has a limited capability). Discharge capability is better with increased energy content (i.e., SOC), thus no capacity is provisioned for HEV functions. The start sequence new battery use is sensitive to ambient temperature 'soaking' between trips. Capability reduces with temperature; discharge is required immediately at the start. Capability degrades with age. For example, the proposed EU7 legislation mandates emissions durability to 15 years, while components are typically designed for a 10-year life.

Moreover, as a consequence of some of the previous problems, there is tension between two different 'attribute degradations' at either the start or the end of the trip. At the start of the trip, a deficit in battery power to the eEGH or TS targets will result in the customer experiencing a 'wait period' and/or derated torque during initial driving. The waiting period is when the internal combustion engine, ICE, runs to warm the catalyst and the user will experience derated torque. At the end of a 'short' trip, the ICE may be forced to 'run-on' to replenish the energy store to mitigate or minimise the severity of the start energy deficiency, especially if this is necessary to maintain emissions levels.

In addition, conflict arises between energy partitioned for tailpipe aftertreatment & HEV functions, including regenerative braking to support brakes emissions. Gasoline-based vehicles require a significant energy reserve to support tailpipe emissions; this will dominate battery capacity, thus HEV functions are sacrificed. However, emerging brakes emissions legislation may require regenerative braking to reduce friction brake use & subsequent brake system. The lighter gasoline vehicles may require minor support, but heavier diesel commercial vehicles will require moderate support. In general HEV functions are desirable from a vehicle attribute perspective.

Accordingly, an objective of the present disclosure is to provide a strategy to enable the low-capacity production 'mHEV battery' to support new legislation. By way of summary, the strategy prevents the common issue of being based on 'protecting battery capability' for the worst-case scenario (i.e., an aged and cold battery) at all times, thus compromising HEV functions for all users. Most users do not encounter the worst-case scenario incorporated into universal control strategies and thus a limited battery, and lose the benefit of full HEV functions. In addition, the control methodologies minimise the occurrence and severity of the attribute degradation for those customers who are likely to encounter a limited capability battery (e.g., short journeys in cold regions with an aged battery).

In some examples, the strategy reserves battery capability (or put another way, conditions the battery) to support the next start sequence (including a full discharge of the eEGH & utilizing TS features of the HEV); in the worst case, this particular strategy reserves the entire battery capacity for the next start (without any HEV functionality), but not all users will encounter the worst case battery capability. Therefore, in some examples, intelligence is built into the methodology to consider battery capability as a function of battery age and forecast temperature via connected data (for example, but not limited to, over-the-air updates); this will ensure the battery capability, based on, for example, age and temperature, at the next start is known and the battery can be conditioned accordingly without compromising HEV functions. In some examples, the method enables flexibility between battery support of tailpipe emissions and HEV functions including EU7 brakes emissions; brakes emissions legislation is still developing. however, regenerative braking may be required, even to support the lighter gasoline vehicle applications, to mitigate the adoption of expensive brake materials in addition to the already assumed HEV system. Lastly, in some examples, user satisfaction is increased, through reduced attribute degradation occurrences; the strategy still incorporates extreme use case scenarios (e.g., cold regions with multiple short journeys), and such users will inevitably still encounter attribute degradation as a function of not fully satisfying the eEGH & TS power requirements.

FIG. 1 illustrates a data flow to a powertrain control module to create battery condition set points, in accordance with at least one of the examples described herein. To achieve the above objectives, a method to enable ambient temperature data to be available to facilitate a decision or action is provided herein. Connected data or over-the-air (OTA) communications providing near-term forecasted temperatures (e.g., daily low temperature for the forthcoming week) at a current location, or a predicted location, of the vehicle, are received by the vehicle and stored locally. In this way, the on-board power control module can make a decision (see, for example, FIG. 2) with regards to likely battery cell temperature at the next vehicle start and will enable a set point request to be generated with regards to likely battery capability as a function of temperature. The main advantage is that the vehicle can prepare for the next forecast 'cold ambient start', accounting for weather change or a 'cold snap' in a proactive fashion.

As shown in box 110, ambient temperature data is measured by the vehicle. In some examples, the temperature data is stored, in other examples, the data is not stored. Storing the data point will enable the battery to be conditioned relative to this recent temperature, but this reactive approach will not account for temperature change between trips. Therefore, the battery may not be optimally conditioned for the next start. A minor temperature change significantly changes battery capability (i.e., 0° C. to −5° C.). Accordingly, forecast data can be used for more granular control over the battery conditioning strategy.

As shown in box 120, the PCM 150 monitors the battery State of Health (SOH) as a function of the battery throughput, that is the relative ability of the battery to maintain charge per cycle or over time. The method mitigates the reduction of battery capability as a function of ageing to maintain emissions robustness. In some examples, the battery SOH is shared by the BMS with the PCM; SOH would enable the PCM to generate a set point input. In some examples, the method is based upon a characterisation of battery capability over its life, with respect to SOC and cell temperature. Therefore it can be determined if the battery is 'aged' and the SOC target can be adjusted accordingly as detailed below.

In some examples, the method arbitrates the required SOC set points relative to anticipated battery capability at the next start, in addition to any mandatory HEV support (for example, regenerative braking for brakes emissions); this is due to the 'new use' modality of the HEV battery (i.e., immediate and extended battery discharge at vehicle start is heavily dependent on battery cell temperature at start, potentially when soaked to −10° C.). For users with a battery that is forecast not to be limited at the next start, (i.e., 'warm' and/or not aged), the strategy can be set to prevent the entire usable energy capacity from being reserved to support the start requirements only. Spare capacity can be 'unreserved' and utilized to support HEV functions during the ongoing trip, such as regenerative braking and engine stop/start.

In some examples, the method is based on a characterisation of battery capability over its life, referred to as battery state of health (SOH), with respect to SOC and cell temperature to ensure capability to support legislation requirements (emissions, and the like) is maintained and HEV functions are not compromised for all. To satisfy the eEGH/TS power requirement, the SOC target set point could be set based on forecast temperature and age, for example, 0° C. ambient temperature=50% SOC at beginning of battery life (BOL), 60% SOC at end of battery life (EOL); −5° C. ambient temperature=60% SOC at BOL, 70% SOC at EOL; −10° C. ambient temperature=65% SOC at BOL, 'high' SOC at EOL, however, other integers would be equally sufficient and battery charge characteristics will vary based on the manufacturer and the like. However, as temperature decreases the initial state of charge at BOL is increased; then, as the battery ages, the SOC set point is increased to account for the inability of the battery to hold the same relative amount of charge. Examples of set points for the functionality of the battery SOC are shown in FIGS. 3A to 7.

For exemplary purposes, end of life is considered when the SOH of the battery is less than <~65%. Moreover, high SOC is the SOC threshold upper limit for battery protection, which is typically around ~75% SOC. Another intention of the present disclosure is to prevent long-term residency at high SOC as this is known to increase battery ageing.

Without the implementation of the present disclosure, HEV functions will be sacrificed as the battery energy capacity is reserved to support discharge for the next start sequence. This is because the vehicle controller does not know what the battery capability may be at the next start as a function of soaked temperature and age and therefore the capacity is reserved to protect for the worst-case capability, even if the battery is unlikely to be limited by temperature and/or age. The battery temperature will increase and thus so will its capability due to the discharge to support eEGH (even if initially soaked to −10° C.). After the start sequence and whilst driving, the battery should have the capability to support HEV functions, including regenerative braking to support brakes emissions if required. However, without an intelligent strategy, the useable energy capacity may be protected for the next start with an assumed worst-case battery capability and HEV functions would be sacrificed. Generally, the method can apply to a system with a battery of greater capability, but the thresholds and functionality may change accordingly. In some examples, a second SOC target could be imposed to reserve energy for additional start sequences or for HEV (to support brake emissions, boost etc) and the strategy could set limits within these thresholds.

As shown in box 130, the PCM 150 receives navigation data. In particular, trip distance is considered to enable full HEV functionality over the majority of an 'extended' trip. The PCM 150 can delay the reservation of energy content to a later point in the trip cycle. For example, if the programmed destination is 200 km away, the PCM 150 may begin to reserve energy content to the target value (SOC set point) when a predetermined 'distance remaining' threshold is achieved, i.e., ~30 km of the journey remaining, thus the full usable battery energy content is 'unreserved' for the first 170 km and able to support full HEV function(s). Accordingly, as shown in box 140, the capacity to support HEV functions, including regenerative braking to support brake legislation, torque substitution, torque supplementation and the like. Depending on the battery capacity and performance, the battery may have the capability to support 2×EU7 start sequence occurrences, especially if the battery is not likely to be limited by age or temperature at the next start. Therefore, later in the trip cycle, the battery may be conditioned to a second set point to be robust to two occurrences of the start sequence. This may be desirable for users who are 'abusive' i.e., conduct short trips and don't completely replenish the battery store. A battery at the upper end of the mHEV capacity and performance threshold may be able to achieve this with a moderate SOC, thus not increasing ageing over the battery life.

The result, as shown in box 160, is a battery conditioned to SOC set point in preparation for the next trip start(s), and optionally spare capacity utilized for HEV functions.

Figure 2:
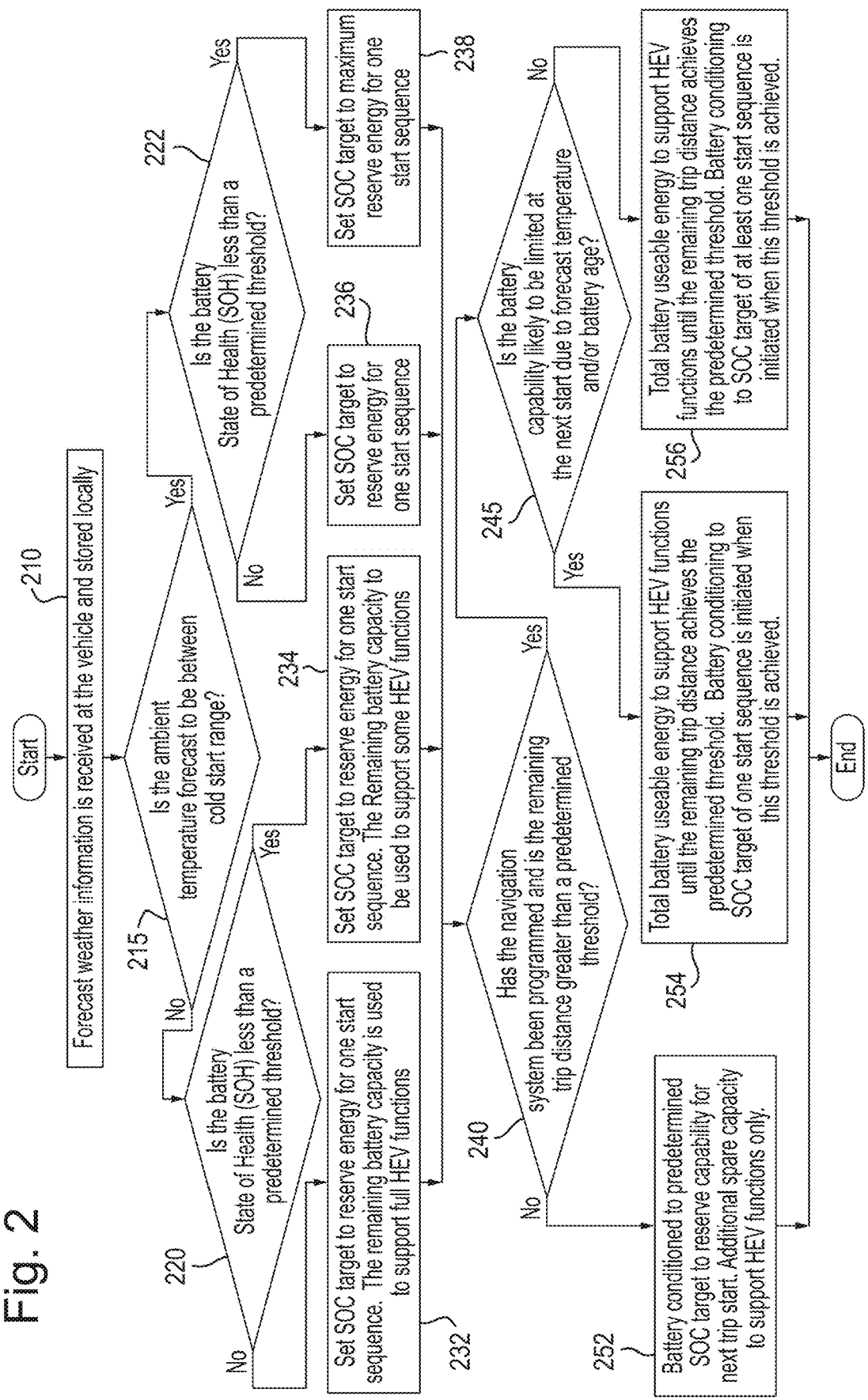
FIG. 2 illustrates an example flow chart of a method for selecting a plurality of control strategies, in accordance with at least one of the examples described herein.

FIG. 2 illustrates an example flow chart of a method for selecting a plurality of control strategies, in accordance with at least one of the examples described herein. Process 200 starts at step 210. At step 210, forecast weather information is received at the vehicle, (e.g., by an over-the-air, OTA, update) and stored locally. At step 215, it is determined whether or not the ambient temperature is forecast to be between a 'cold' start range e.g., −10° C. to 0° C. If the answer to step 215 is no, process 200 continues to step 220. If the answer to step 215 is yes, process 200 continues to step 222.

At step 220, it is determined if the battery State of Health (SOH) is less than a predetermined threshold, e.g., SOH<65%. If the answer to step 220 is no, process 200 continues to step 232. If the answer to step 220 is yes, process 200 continues to step 234. At step 232, the SOC target is set to reserve energy for one start sequence (e.g., 1×EU7 start sequence), which may be, for example, 50% of SOC. In addition, the remaining battery capacity is used to support full HEV functions. Typically, a non-limited carry-over production battery can support two start sequences from its capacity. However, we propose to adapt the methodology to reserve energy for one start sequence and use the newly made spare energy storage capacity to support full HEV functions, especially if brake emissions must be supported. If the navigation input is available, the energy reserve will be delayed until later in the drive cycle, as described below with reference to decision 240 onwards.

At step 234, the SOC target is set to reserve energy for one start sequence (e.g., 1×EU7 start sequence), which may be, for example, 60% of SOC. In addition, the remaining battery capacity is used to support some HEV functions. Typically, a carry-over production battery that is aged but warm has the capability to support one start sequence, but not two start sequences. However, it does have some headroom in addition to the one-start sequence requirement that can be used to support some, or at least minimal, HEV functions. This would change if a battery of increased performance/capacity is selected or if the navigation is programmed at a later step. In some examples, the HEV functions can be ranked by the user or a configurable preferred list of HEV functions can be provided, and the energy stored for the HEV functions can be utilized according to the user-preferred list.

At step 222, it is determined if the battery State of Health (SOH) is less than a predetermined threshold, e.g., SOH<65%. If the answer to step 222 is no, process 200 continues to step 236. If the answer to step 222 is yes, process 200 continues to step 238. At step 236, the SOC target is set to reserve energy for one start sequence (e.g., 1×EU7 start sequence), which may be, for example, 65% of SOC. Typically, a non-aged carry-over production battery which is soaked cold at vehicle start can satisfy one start sequence if the SOC is ~65%. The SOC target may not need to be set to SOC high (i.e., the maximum allowable SOC threshold) in this scenario, which will minimise the bearing on durability over time (residency at 'greater' SOC increases ageing/degradation over time).

At step 238, the SOC target is set to reserve energy for one start sequence (e.g., 1×EU7 start sequence), which is the maximum amount of SOC. This situation refers to the most 'limited' production battery, which may not fully satisfy the EU7 start sequence requirement. Thus, the battery must be preconditioned by the end of the trip to have achieved the 'highest' permitted SOC threshold to limit the severity of the attribute degradation at the next start. Without the proposed solution this approach is likely to be adopted, even if the battery is not limited, to protect for the worst-case battery capability in all scenarios to satisfy tailpipe requirements at the next start. The solutions in steps 232, 234 and 236 would not be adopted. Ideally, process 200 seeks to prevent no HEV functions being available for all customers, increased exposure to ICE 'run on' (SOC high target) and additional battery ageing (residency at SOC high). The present disclosure intends to only reserve the entire useable energy capacity for the EU7 tailpipe when it is necessary, to enable battery capacity to support HEV functions and perhaps additional EU7 tailpipe start sequences. The strategy is focused on ensuring that the carry-over production battery can satisfy emissions and is palatable for the user (minimal attribute degradations), but could also apply to a battery of greater capability. In this case, the thresholds and functions relative to capability may change, a more capable battery may support two starts sequences when cold for instance.

Process 200 may end after the above steps and processes. However, in some examples, navigation data may also be considered, and therefore process 200 can continue to step 240. At step 240, it is determined if a navigation system has been programmed and if the remaining trip distance is greater than a predetermined threshold, e.g., >30 km. If the answer to step 240 is no, process 200 continues to step 252. If the answer to step 240 is yes, process 200 continues to step 245. Using the navigation input enables the full usable battery energy to be used to support hybrid (HEV) functions for the majority of a long-distance trip. This can be utilised to support HEV functions until the last 'phase' of the trip when an energy reserve needs to be developed in preparation for the next start sequence.

At step 252, the system conditions the battery to a predetermined SOC target to reserve capacity for the next trip start. In addition, any additional spare capacity supports HEV functions only. Put another way, if the navigation is not programmed or there are insufficient trip distances the strategy defaults to use cases in steps 232, 234, 236, and 238.

At step 245, it is determined if the battery capacity is likely to be limited at the next start due to forecast temperature and or battery age. If the answer to step 245 is yes, process 200 continues to step 254. If the answer to step 245 is no, process 200 continues to step 256. At step 254, the total battery useable energy is used to support HEV functions until the remaining trip distance achieves the predetermined threshold, or a second threshold lower than the first threshold, e.g., ≤15 km. In addition, battery conditioning to a predetermined SOC target is initiated when this threshold is achieved, i.e., for one start sequence (e.g., 1×EU7 start sequence).

At step 256, the total battery useable energy is used to support HEV functions until the remaining trip distance achieves the predetermined threshold. In addition, battery conditioning to SOC target of at least one start sequence is initiated when this threshold is achieved, i.e., for 2×EU7 starts. Accordingly, HEV functions and start emissions robustness are maintained, and attribute degradation is minimised. Typically, a production battery (e.g., 48V or mHEV) can support two start sequences, when not limited. However, if HEV functions are still required to maintain brake emissions in the final phase of the trip, the conditioning may only support an energy reserve for one start sequence to enable capacity for HEV functions. This is dependent on the final brakes emissions requirements and selected battery capability, however, to provide flexibility to support either additional start sequences, HEV, and/or brakes emissions with a typical 48V battery.

In some examples, process 200 may comprise activating an after-treatment system including an eEGH and a catalyst, as described with reference to FIG. 8. The after-treatment system is heated until it reaches a threshold temperature, which may be the same as the most efficient temperature of the catalyst, e.g., for a given operating condition. In some examples, the threshold temperature may be above the most efficient temperature of the catalyst, to allow for some cooling effects between ending the heating of the after-treatment system and later starting an engine. In some examples, the threshold temperature may be below the most efficient temperature of the catalyst, to allow for heating from the engine exhaust to bring the catalyst to its most efficient temperature. Accordingly, the energy required for a start sequence is also configurable, and not a fixed energy requirement and this can be built into the "start sequence" conditioning of the battery, and thus process 200.

Figure 3A:
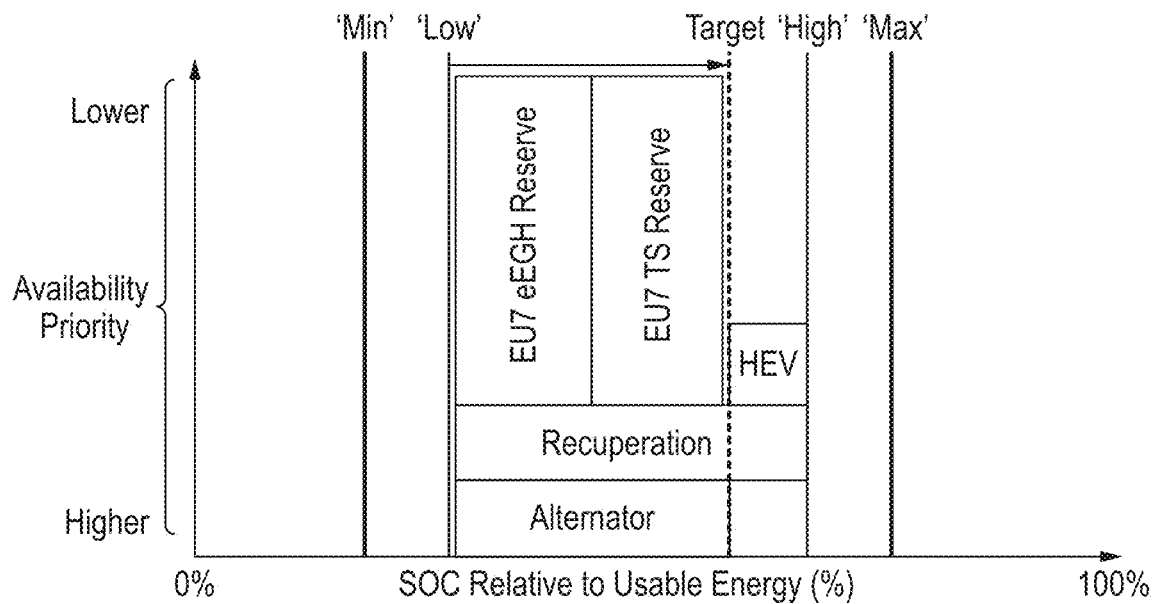
FIGS. 3A to 3B illustrate graphs of battery control strategies for a battery at different stages of life for a low temperature, in accordance with at least one of the examples described herein.
Figure 3B:
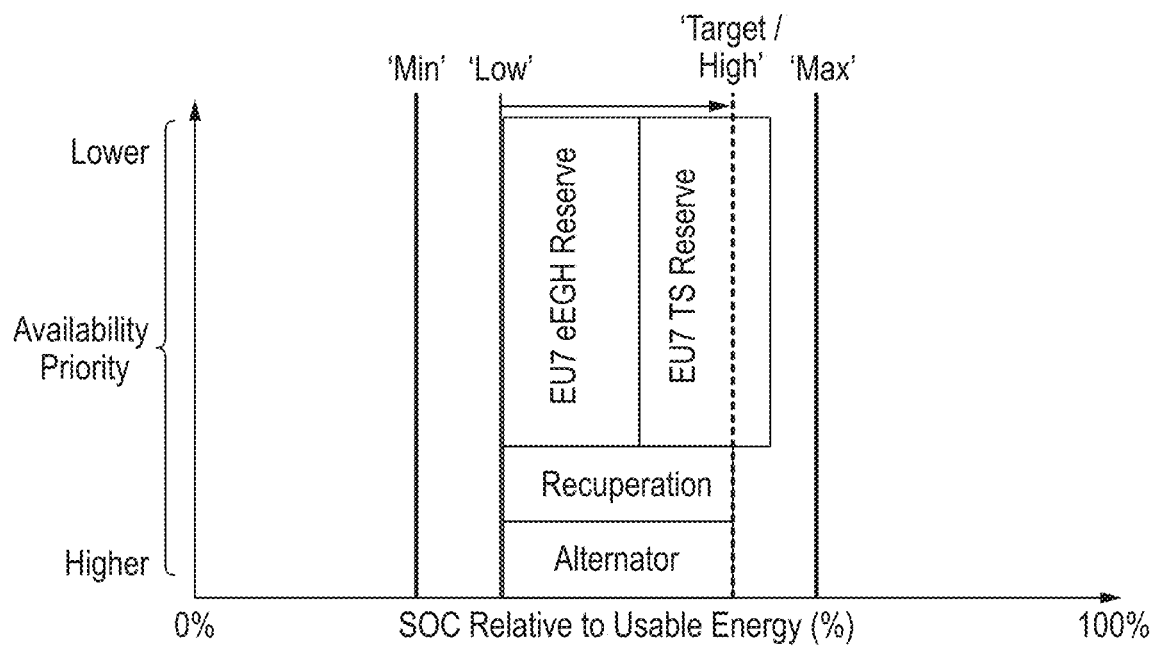

FIGS. 3A to 3B illustrate graphs of battery condition strategies for a battery at different stages of life for a low battery cell temperature, in accordance with at least one of the examples described herein. FIG. 3A, deals with a start sequence with a 'cold' battery at beginning of life (BOL), which corresponds to the use case as described in step 236 of process 200. As the navigation has not been programmed the battery is conditioned to reserve energy to support the next start sequence from the beginning of the current trip and this reserve must be maintained throughout the trip as the trip could end at any time. As the forecast temperature is 'cold' e.g., −10° C. and the battery is at BOL, the SOC target is set to ~65%, at which the battery can support the next start requirement in this condition.

When cold at BOL, the production battery has limited capacity to support HEV functions in addition to the next start sequence (between the SOC 'high' protection limit and the target set point). The battery can support limited HEV functions, but its temperature will increase as a function of the initial discharge to support the start sequence (eEGH & TS) and the energy store will reduce. These factors enable better-quality regeneration capacity. For the lighter gasoline vehicle applications, it may be sufficient to support brakes emissions (if required) and the system would load shed if required.

Without the proposed strategy, the battery may not have the capability to satisfy emissions at the start of the next trip as the useable energy content may not be sufficient to ensure battery capability, thus the user will be exposed to the attribute degradation, a wait with the engine running to heat the aftertreatment and experience torque derate on initial drive.

FIG. 3B deals with a start sequence with a 'cold' battery at end of life (EOL), which corresponds to the use case as described in step 238 of process 200. The battery capability is most limited in this use case. In this case, the strategy is intended to minimise the length of the waiting period or the severity of the derate for those users exposed to a −10° C. soaked vehicle start. Note the target is now the 'SOC high' i.e., the upper limit of permissible battery energy content or battery charge. The process here seeks to establish the battery capability at the next trip start, as a function of the forecast temperature and battery age and condition the battery accordingly. Without this knowledge, there is a chance a non-intelligent strategy would condition the SOC high, to protect the battery capability for the worst-case use case as shown in FIG. 3B (hence shown are no HEV functions) in all scenarios, including when the battery is not limited due to its capability at the next start being unknown. In this worst case, the battery can't reserve its energy content in preparation for the next start sequence whilst supporting HEV functions (including regeneration to support brakes emissions). If HEV is required during the ongoing trip, the set point manager will reduce the set point target to free capacity to support regeneration. This is not optimal and will expose the user to the attribute degradation at the next start, such as enforced stationary waiting periods with the ICE running prior to driving and derated torque during initial driving, to satisfy emissions requirements.

Figure 4A:
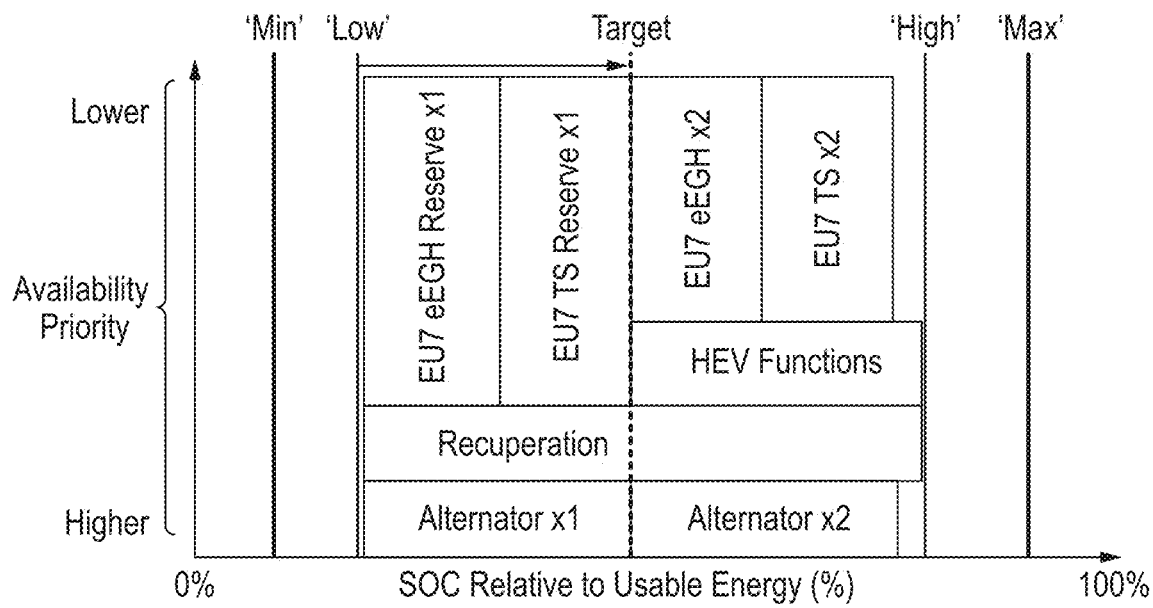
FIGS. 4A and 4B illustrate graphs of battery control strategies for a battery at different stages of life for a mid-temperature, with respect to a hybrid battery, in accordance with at least one of the examples described herein.
Figure 4B:
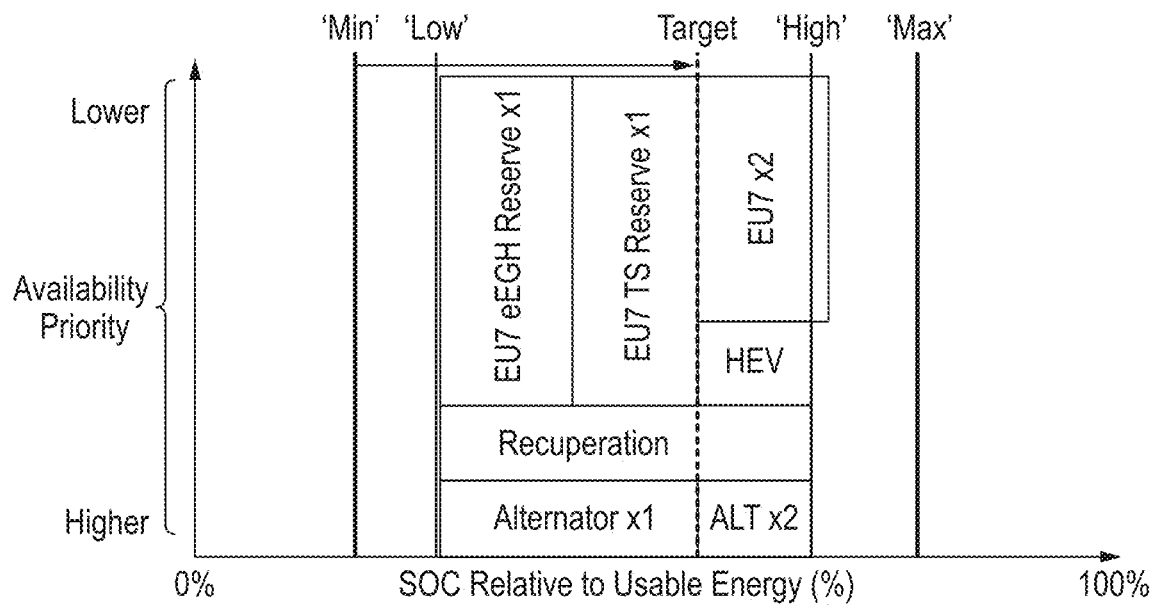

FIGS. 4A and 4B illustrate graphs of battery condition strategies for a battery at different stages of life for a mid-temperature, with respect to a hybrid battery, in accordance with at least one of the examples described herein. FIG. 4A deals with 'warm' Beginning of Life (BOL) corresponding to the use as described in step 232 of process 200. At warmer cell temperatures the battery has less resistance and thus its capability for a given SOC is enhanced. As the navigation has not been programmed, the strategy sets the SOC target to, for example, 50%, to guarantee the next start sequence energy is reserved as the priority. The advantage of this methodology is that the 'spare' battery capacity available (between the 50% SOC and SOC 'High' thresholds) can be utilised for all HEV functions desired. Overall the strategy offers flexibility to use the battery to enable some HEV functionality whilst still maintaining a reserve to support the next EU7 start sequence. The battery capacity is not solely reserved to mitigate the worst-case scenario (i.e., FIG. 3B) for all conditions as the likely trip start cell temperature and battery age is known as a function of the proposed strategy. Generally, the strategy could apply to a system with a battery of greater capability, but the thresholds and functionality may change accordingly. For instance, a second SOC target could be imposed to reserve energy for additional start sequences or for HEV (to support brake emissions, boost etc).

FIG. 4B deals with 'warm' End of Life (BOL) corresponding to the use as described in step 234 of process 200. In this use case, the proposed strategy is to build an energy reserve in preparation for the next start sequence. The SOC target is set to, for example, 60% to achieve this (recall that the relative BOL battery SOC in this temperature scenario was 50%). In comparison to FIG. 4A and use case 232, the battery has less usable capacity due to its age. Thus, there is less spare capacity to support HEV or additional EU7 start sequences in addition to the set point target. This additional capacity is not reserved, HEV functions may be prioritised but any 'left over' HEV energy content could be used to support tailpipe emissions if required (in addition to the reserved energy) and this is common with the other use cases without navigational input.

Figure 5:
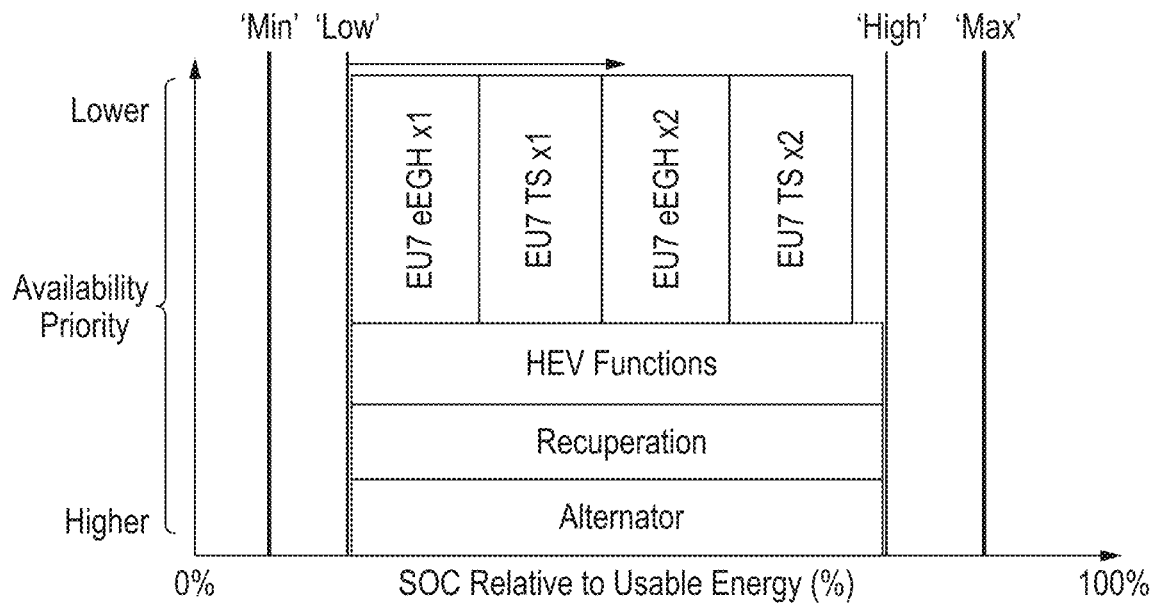
FIG. 5 illustrates an exemplary graph of the relative state of charge for a battery taking into account navigation data, in accordance with at least one of the examples described herein.

FIG. 5 illustrates an exemplary graph of the relative state of charge for a battery taking into account navigation data, in accordance with at least one of the examples described herein. FIG. 5 deals with the bearing of navigation input in a full HEV-enabled strategy; use as steps 254 and 256 of process 200. With navigational input, the entire useable energy is 'unreserved' and used to support HEV functions until a predetermined 'distance remaining' threshold is achieved. At the point the remaining distance threshold is achieved, the strategy progresses to either step 254 (FIG. 6), or 256 (FIG. 7) with regard to the battery capability.

Figure 6:
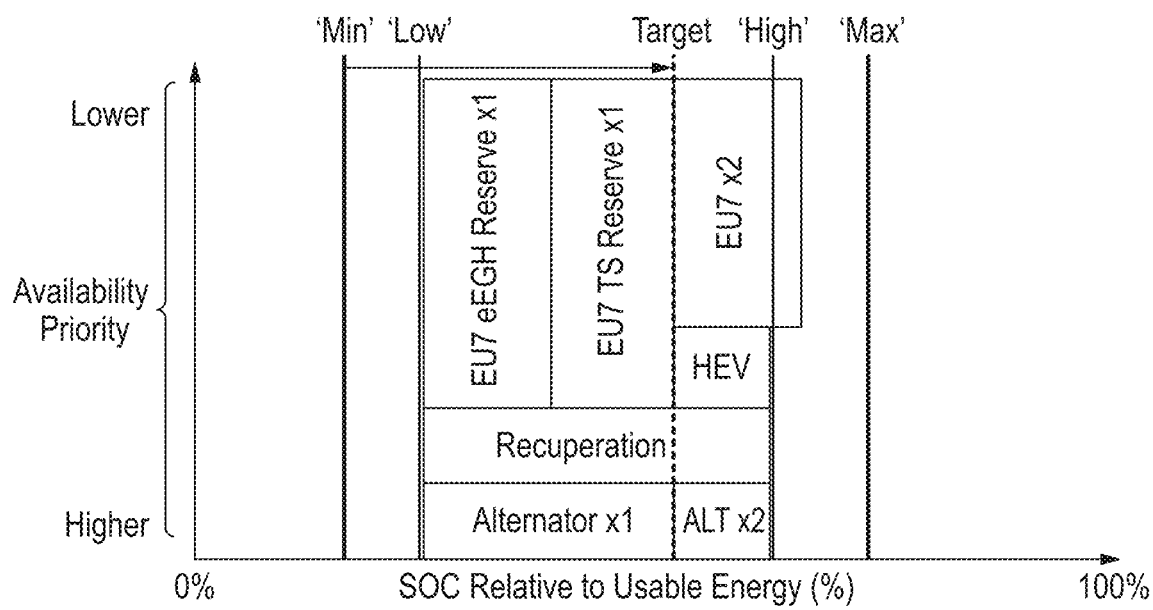
FIG. 6 illustrates an exemplary graph of the relative state of charge and priority for start sequences of a limited capability production battery, in accordance with at least one of the examples described herein.

FIG. 6 illustrates an exemplary graph of the relative state of charge and priority for start sequences of a limited capability production battery, in accordance with at least one of the examples described herein. FIG. 6 deals with the influence of navigation input on a production battery likely to be limited (i.e., only capable of one start sequence reserve), step 254 of process 200. Once the predetermined 'distance remaining' threshold is achieved the strategy prioritises the next start sequence reserve over the HEV functions in preparation for the next start. Hence, FIG. 6 shows that once the distance remaining threshold is achieved, the strategy sets the SOC target to initiate storage to meet the next start emissions requirement (eEGH & TS). If current production batteries are likely to be limited by age or forecast temperature at the next start, then they will not be able to support two start sequences and it is only, therefore, conditioned to support one start sequence, i.e., use case 254 of process 200 as per the prior predetermined SOC thresholds. HEV functions can continue to be supported for the remainder of the cycle although at a reduced capability.

Figure 7:
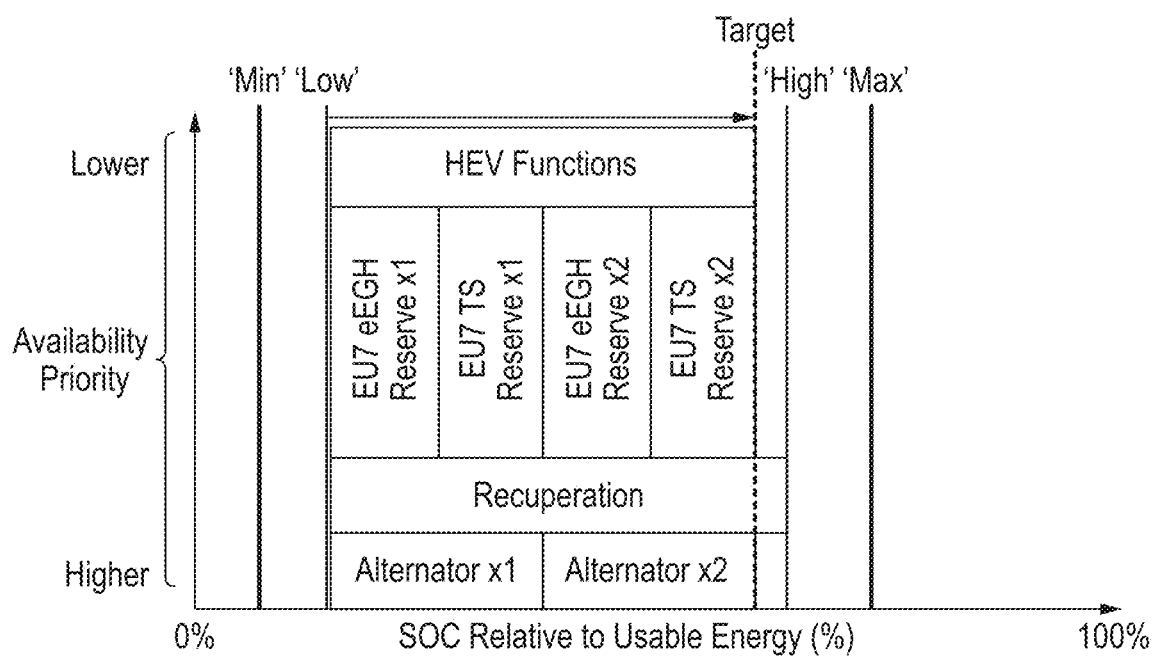
FIG. 7 illustrates an exemplary graph of the relative state of charge and priority for start sequences of a non-limited capability production battery, in accordance with at least one of the examples described herein.

FIG. 7 illustrates an exemplary graph of the relative state of charge and priority for start sequences of a non-limited capability production battery, in accordance with at least one of the examples described herein. FIG. 7 deals with the influence of navigation input on a production battery not likely to be limited, i.e., two sequence start reserves. FIG. 7 shows that if the battery is not aged or is limited by the temperature at the next start, the total usable energy is sufficient for the current production battery to support two start sequences, therefore once the trip distance remaining threshold is achieved, the battery is conditioned to be robust against short drive cycles or driveway shuffling, i.e., if the next trip is too short to recover the first start sequence energy, there is a reserve for a second start sequence. HEV functions are deprioritised at the predetermined distance remaining threshold unless the gasoline applications do require the support of the high voltage system to support brakes emissions for the remainder of the drive cycle. In this case, the secondary start sequence energy provisions for tailpipe emissions may not be reserved and instead utilized to support HEV. This would be dependent on the selected battery and its capability.

By way of example, a typical battery (48V or mHEV battery) and its energy content and requirements are approximately ~110 Wh at BOL and ~95 Wh at EOL. The energy required to be reserved for one start sequence is ~44 Wh. This is made up of 4 kW for the eEGH for around 20 seconds (4*1000*20/3600=22 Wh) and 4 kW for torque substitution for around 20 seconds. However, discharge performance is related to energy content and 'greater' energy content may be required in some scenarios to satisfy performance. Hence, when the battery is limited (e.g., cold) the SOC target has to be increased sufficiently to reserve the energy required to ensure the next start sequence performance requirement is achieved. When the battery is limited (cold & at EOL) ~60% SOC reserve could be required and this may only reserve one start sequence, while when the battery is not limited (BOL and 'warm') it could be ~40%, allowing some headroom on top of this reserve to support HEV or additional occurrences of the start sequence.

Figure 8:
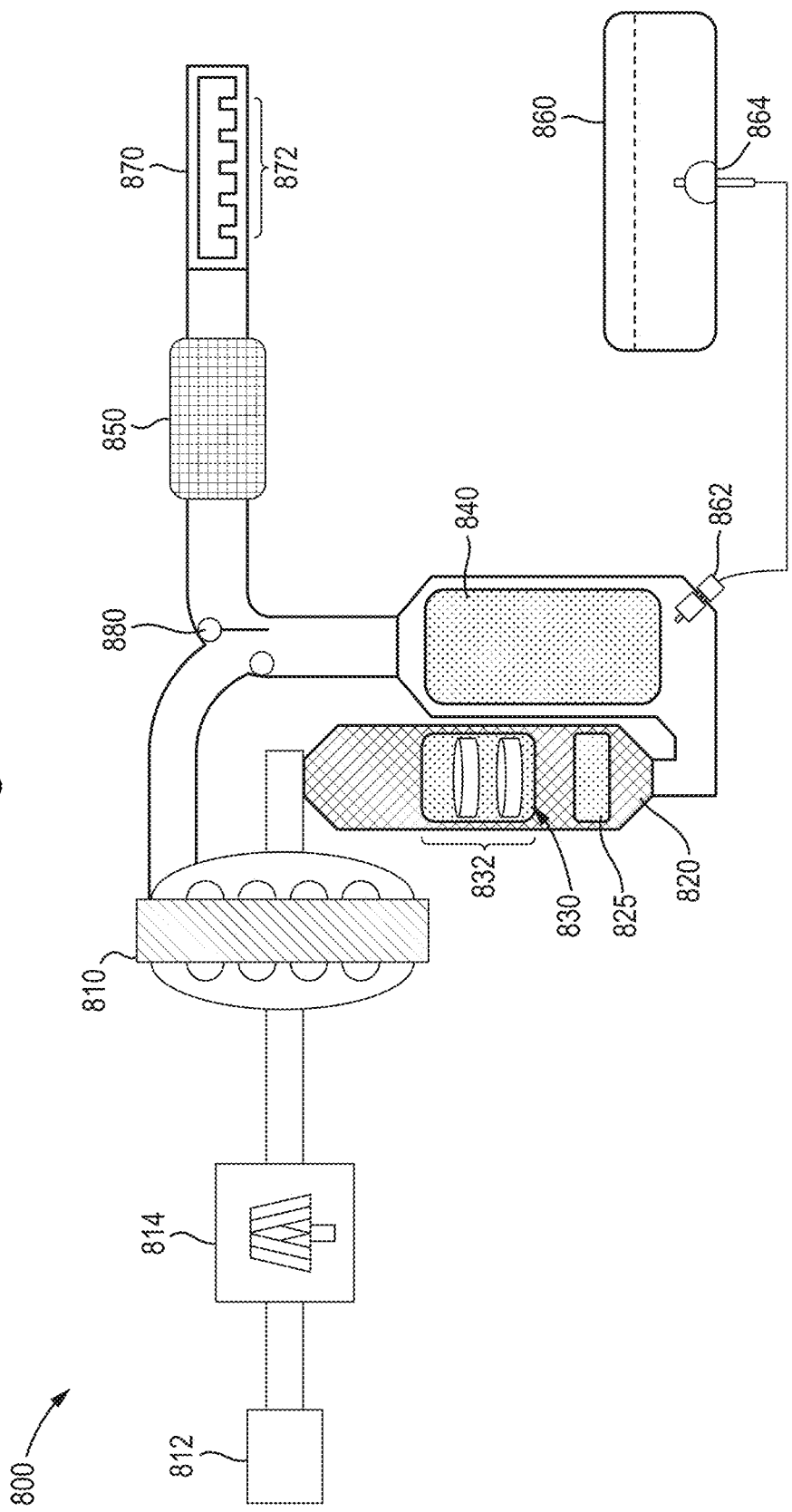
FIG. 8 illustrates an exemplary exhaust system comprising an after-treatment system, in accordance with at least one of the examples described herein.

FIG. 8 illustrates an exemplary exhaust system comprising an after-treatment system, in accordance with at least one of the examples described herein. An after-treatment system such as the one depicted comprises some electrical load components that can be activated to not only deploy energy from the vehicle battery but also have additional benefits. For example, as shown in FIG. 8, an exemplary exhaust system 800 from a vehicle such as a hybrid vehicle may comprise an engine 810 and an after-treatment system, which comprises an electronic exhaust gas heater (eEGH)

820. In some examples, the eEGH 820 comprises a catalyst 825 that is provided heat by a plurality of heating elements 832, powered by the battery of the vehicle.

In some examples, and as shown in FIG. 8, there is provided with an air-box 812 connected to a compressor 814 to draw air from the atmosphere. The airbox 812 and compressor 814 are fluidly connected to engine 810 and the after-treatment system to transfer thermal energy from a plurality of heating elements 832 disposed within the heating module 830 within the after-treatment system to the rest of the after-treatment system (e.g., to the catalyst 825). In some examples, to support local emissions rules, additional systems such as an e-compressor 814 may be required.

In some examples, there is a diesel particulate filter 840 downstream of engine 810. A diesel particulate filter (DPF) is a filter that captures and stores exhaust soot, coke, and/or char, collectively referred to as particulate matter. The DPF is another form of after-treatment utilized to reduce emissions from diesel cars. DPFs have a finite capacity, the trapped particulate matter periodically has to be emptied or 'burned off' to regenerate the DPF, which an eEGH may also be used to assist with. This regeneration process cleanly burns off the excess particular matter deposited in the filter, reducing the detrimental exhaust emission. In some examples, the filter regeneration process may be initiated in response to predicting that there will be no increase in torque demand. For example, if the amount of particular matter within the after-treatment system is determined to be above a threshold and a regeneration process is required, the after-treatment system can wait until a prediction that no increase in torque demand will be made by the driver to regenerate the after-treatment system (e.g., the DPF). Thus, in a system such as that presently required, activating the eEGH more than other electrical loads may be favoured to ensure that the DPF is regenerated and in optimal condition.

In some examples, wherein the vehicle's internal combustion engine is fuelled by gasoline, there is a gasoline particulate filter (GPF), which would replace the DPF as described above, downstream of engine 810. Similar to a DPF, a GPF is a filter that captures and stores exhaust soot, coke, and/or char, collectively referred to as particulate matter. The GPF is another form of after-treatment utilized to reduce emissions from gasoline vehicles. GPFs have a finite capacity, the trapped particulate matter periodically has to be emptied or 'burned off' to regenerate the GPF, which an eEGH may also be used to assist with. This regeneration process cleanly burns off the excess particular matter deposited in the filter, reducing the detrimental exhaust emission. In some examples, the regeneration process may be initiated in response to predicting that there will be a braking event. For example, if the amount of particulate matter within the after-treatment system is determined to be above a threshold and a regeneration process is required, the after-treatment system can wait until a prediction that a braking event will be made by the driver and then the eEGH can be activated to regenerate the after-treatment filters (e.g., the GPF). Thus, in a system such as that presently required, activating the eEGH more than other electrical loads may be favoured to ensure that the DPF is regenerated and in optimal condition.

In some examples, there is also provided a selective catalytic reduction (SCR) 850 system. An SCR is another emissions control technology system that injects a liquid-reductant agent through a special catalyst into the exhaust stream of engines, in particular diesel engines. The reductant source is usually automotive-grade urea, otherwise known as diesel exhaust fluid (DEF). The DEF sets off a chemical reaction that converts nitrogen oxides into nitrogen, water, and low amounts of carbon dioxide (CO2), which is then expelled through the vehicle tailpipe 870. The DEF may be stored in a DEF tank 860. The DEF may be distributed through several pumps and valves 862 and 864, as shown in FIG. 8. The number of pumps and valves 862 and 864 are for illustration purposes and additional pumps and valves 862 and 864 may be located throughout the exhaust and/or after-treatment system. The location of the pumps and valves 862 and 864 are similar for illustration purposes and the location of the pumps and valves 862 and 864 can be different from that shown in FIG. 8.

In some examples, the exhaust system comprises several sensors 872 to detect the flue gas containing oxides of nitrogen (NOx) and oxides of sulphur (SOx), to ensure the final emissions are within a guideline amount. Euro 5 exhaust emission legislation and Euro 6 exhaust emission legislation, have effectively made it mandatory for DPFs, DEF, and SCRs to meet the emissions standards. However, in future emission legislation, such as Euro 7, such technology alone may not be sufficient. The systems and embodiments described herein may therefore work in conjunction with DPFs, DEF, and SCRs of a vehicle's aftertreatment system (i.e., more regular activation, or the like).

In some examples, the exhaust system comprises an exhaust gas recovery system, which is enabled by an EGR switch 880. The EGR switch 880 enables some or all exhaust gas, or the thermal energy of the exhaust gas, to be recirculated through the exhaust system to further compound the heating effect of the heating element 832 within the heating module 830.

Electrically heated catalysts, or eEGHs, are a type of catalytic converter, which have been in use for a number of years. An eEGH typically comprises a heating element disposed within, or near, a catalyst. eEGHs are required in various use cases and will demand a power supply between 0-4 kW (0 to 4000 Watts) for example, depending on the use case. For example, the heating elements within the eEGHs will have a thermal output of 0-4 kW (0 to 4000 Watts). An eEGH typically has low inductance and therefore the power output (or thermal power output) can be changed rapidly. The eEGH produces thermal power to warm the catalyst but consumes electrical current to produce the thermal power. The eEGH demand is supported by a hybrid powertrain electrical system in an HEV or PHEV platform. For example, in a cold start use case, the eEGH may demand its full rated power (e.g., ~4 kW) to maintain after-treatment temperature. In some examples, the power control module (PCM) demands the eEGH-rated power from the HEV system for ~200 seconds. This load will be supported by the hybrid battery transiently until the e-machine can respond to support the load. However, in some use cases in which the e-machine can't support the total demand, the battery will need to support the eEGH power supply. Thus, in some examples, the eEGH is an ideal system to activate to reduce the battery SOC in anticipation of a regenerative braking event.

During electric-only driving, without thermal energy from the engine, the optimal aftertreatment temperature would not be maintained for all use cases. Therefore, if the engine is started, the emissions requirements may be exceeded. Accordingly, the present disclosure will aid in keeping the catalyst warm with an effective preheating strategy for the PHEV or FHEV applications, by utilizing the eEGH in response to, or in anticipation of, a regenerative braking event.

The systems and methods described herein may be used to deploy electrical loads (such as heating elements 832 of the eEGH) to condition the battery SOC in anticipation of a regenerative braking event to ensure capacity is available to harvest the generated electricity from the negative torque applied by the e-machine during braking. Additionally, if the engine needs to start to satisfy a driver demand, with the aftertreatment also preconditioned as a secondary effect of deploying electrical loads such as the eEGH, the engine can start within the EU7 emissions legislation.

Figure 9:
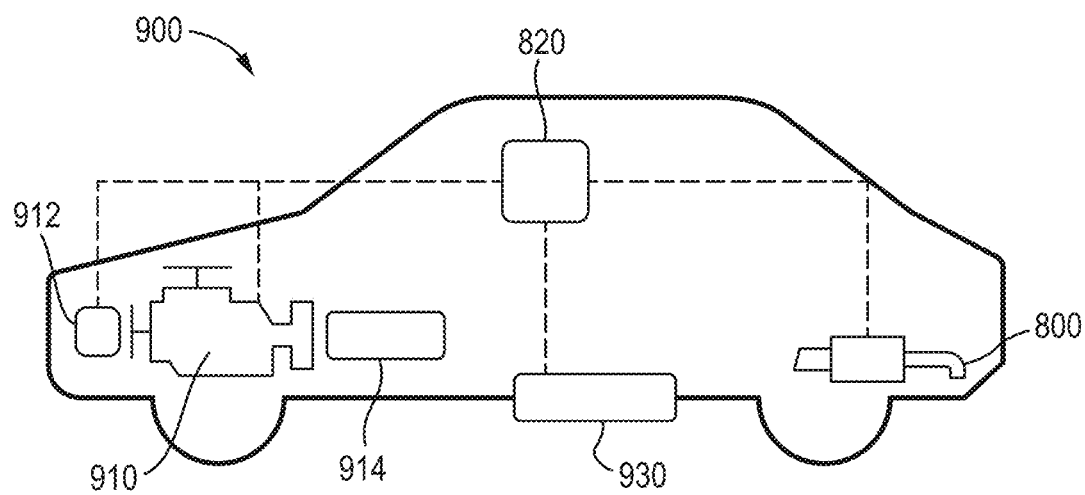
FIG. 9 illustrates a vehicle comprising an engine and an exemplary exhaust system, in accordance with at least one of the examples described herein.

FIG. 9 illustrates a vehicle comprising an engine and an exemplary exhaust system, in accordance with at least one of the examples described herein. FIG. 9 illustrates a vehicle 900 comprising an engine 910, an exemplary exhaust system 900, a control module 920, and a battery 930, in accordance with at least one of the examples described herein. According to some examples, there is provided a vehicle 900 comprising an exhaust system 800 as described with reference to FIG. 8. In some examples, the vehicle further comprises a drive train comprising an e-machine 912, an engine 910, clutch and transmission 914.

The methods described above may be implemented on vehicle 900. Each of the systems in the vehicle is communicatively coupled via controller 920 (illustrated by the dashed line connectors). However, the present disclosure is not limited to the set-up shown in FIG. 9. For example, the controller 920 may be any appropriate type of controller, such as a stand-alone controller, or any other appropriate controller of the hybrid vehicle. For example, the controller 920 may, at least in part, be integrated with another controller of the vehicle. Furthermore, the controller 920 may be configured to operationally communicate with any one or more of the vehicle components shown in FIGS. 8-10, and/or any other appropriate components of the vehicle. For example, controller 920 may be a stand-alone controller at least partially configured to operationally communicate with at least one low-voltage accessory, an electric generator, and an eEGH, to control torque demand on engine 910. Furthermore, it is understood that controller 920 may be configured to carry out one or more of the above-disclosed electrical power control methods for a hybrid vehicle, as described above.

Accordingly, with less cycling of the battery over the expected lifetime of the vehicle, the proposed solutions enable a reduction in the degradation or ageing in battery life, without the need to increase the battery capacity. The advantages of the present disclosure are clear and have been described throughout.

Figure 10:
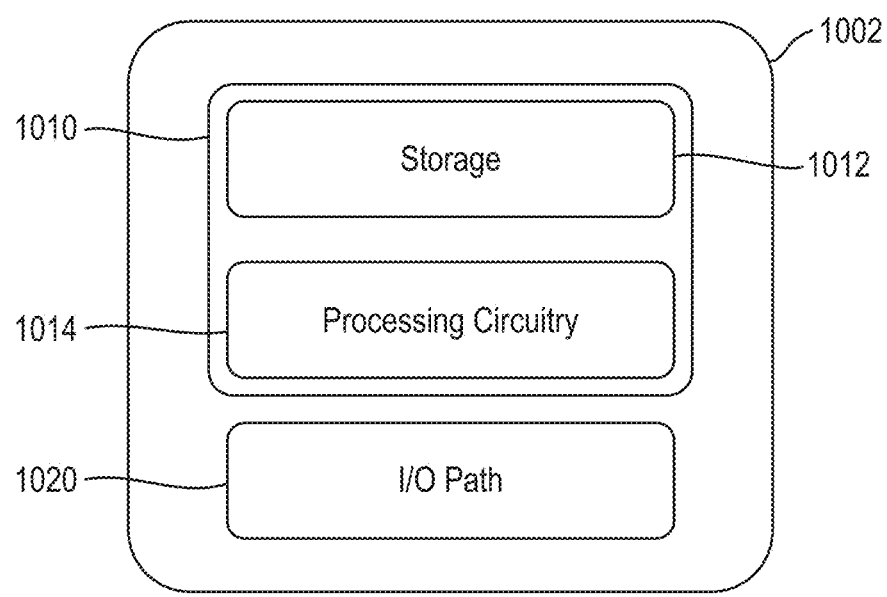
FIG. 10 illustrates a block diagram of a computing module, in accordance with some embodiments of the disclosure.

FIG. 10 illustrates a block diagram of a computing module, in accordance with some embodiments of the disclosure. In some examples, computing module 1002 may be communicatively connected to a user interface. In some examples, computing module 1002, may be the controller 1020 of vehicle 900 as described in FIG. 9. In some examples, computing module 1002 may include processing circuitry, control circuitry, and storage (e.g., RAM (Random Access Memory), ROM (Read Only Memory), hard disk, a removable disk, etc.). Computing module 1002 may include an input/output path 1020. I/O path 1020 may provide device information, or other data, over a local area network (LAN) or wide area network (WAN), and/or other content and data to control circuitry 1010, which includes processing circuitry 1014 and storage 1012. Control circuitry 1010 may be used to send and receive commands, requests, signals (digital and analogue), and other suitable data using I/O path 1020. I/O path 1020 may connect control circuitry 1010 (and specifically processing circuitry 1014) to one or more communications paths. In some examples, computing module 1002 may be an on-board computer of a vehicle, such as a vehicle 1000.

Control circuitry 1010 may be based on any suitable processing circuitry such as processing circuitry 1014. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some examples, processing circuitry may be distributed across multiple separate processors or processing units, for example, multiple of the same type of processing units (e.g. two Intel Core i7 processors) or multiple different processors (e.g., an Intel Core i5 processor and an Intel Core i7 processor). In some examples, control circuitry 1014 executes instructions for computing module 1002 stored in memory (e.g., storage 1012).

The memory may be an electronic storage device provided as storage 1012, which is part of control circuitry 1010. As referred to herein, the phrase "electronic storage device" or "storage device" should be understood to mean any device for storing electronic data, computer software, or firmware, such as random-access memory, read-only memory, hard drives, solid-state devices, quantum storage devices, or any other suitable fixed or removable storage devices, and/or any combination of the same. Non-volatile memory may also be used (e.g., to launch a boot-up routine and other instructions). Storage 1012 may be sub-divided into different spaces such as kernel space and user space. Kernel space is a portion of memory or storage that is, e.g., reserved for running a privileged operating system kernel, kernel extensions, and most device drivers. User space may be considered an area of memory or storage where application software generally executes and is kept separate from kernel space so as to not interfere with system-vital processes. Kernel mode may be considered as a mode when control circuitry 1010 has permission to operate on data in kernel space, while applications running in user mode must request control circuitry 1010 to perform tasks in kernel mode on its behalf.

Computing module 1002 may be coupled to a communications network. The communication network may be one or more networks including the Internet, a mobile phone network, mobile voice or data network (e.g., a 3G, 4G, 5G or LTE network), mesh network, peer-to-peer network, cable network, cable reception (e.g., coaxial), microwave link, DSL (Digital Subscriber Line) reception, cable internet reception, fibre reception, over-the-air infrastructure or other types of communications network or combinations of communications networks.

Computing module 1002 may be coupled to a secondary communication network (e.g., Bluetooth, Near Field Communication, service provider proprietary networks, or wired connection) to the selected device for generation for playback. Paths may separately or together include one or more communications paths, such as a satellite path, a fiber-optic path, a cable path, a path that supports Internet communications, free-space connections (e.g., for broadcast or other wireless signals), or any other suitable wired or wireless communications path or combination of such paths.

In some examples, the control circuitry 1010 is configured to carry out any of the methods as described herein. For example, storage 1012 may be a non-transitory computer-readable medium having instructions encoded thereon, to be carried out by processing circuitry 1014, which cause control circuitry 1010 to carry out a method of controlling a regenerative braking system comprising a battery. The method comprising detecting that the battery state of charge is above a first threshold level; and activating a first electrical load prior to activation of the regenerative braking system to reduce the battery state of charge below the first threshold level.

FIG. 11 illustrates an example flow chart of a method for selecting a battery control strategy, in accordance with at least one of the examples described herein. Process 1100 starts at step 1110, forecast weather information at a first location is received. At step 1120, an operational parameter of the hybrid battery is determined. At step 1130, a first battery control strategy based on the forecast weather information and the operational parameter of the hybrid battery is selected, wherein the control strategy comprises a state of charge target for the hybrid battery required for the next start sequence. In some examples, the operational parameter is the battery state of health data. In other examples, the operational parameter comprises at least one of current ambient temperature; a state of charge of the hybrid battery of the vehicle; a time since a last engine start; battery age data; further weather forecast data; navigation data; or a delta temperature between the temperature of the aftertreatment system and the ambient temperature.

It should be understood that the examples described above are not mutually exclusive with any of the other examples described with reference to FIGS. 1-11. The order of the description of any examples is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

Other variations to the disclosed embodiments can be understood and effected by those skilled in the art of practising the claimed disclosure, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

This disclosure is made to illustrate the general principles of the systems and processes discussed above and is intended to be illustrative rather than limiting. More generally, the above disclosure is meant to be exemplary and not limiting and the scope of the disclosure is best determined by reference to the appended claims. In other words, only the claims that follow are meant to set bounds as to what the present disclosure includes.

While the present disclosure is described with reference to particular example applications, it shall be appreciated that the disclosure is not limited thereto. It will be apparent to those skilled in the art that various modifications may be made without departing from the scope and spirit of the present disclosure. Those skilled in the art would appreciate that the actions of the processes discussed herein may be omitted, modified, combined, and/or rearranged, and any additional actions may be performed without departing from the scope of the disclosure.

Any system feature as described herein may also be provided as a method feature and vice versa. As used herein, means plus function features may be expressed alternatively in terms of their corresponding structure. It shall be further appreciated that the systems and/or methods described above may be applied to, or used in accordance with, other systems and/or methods.

Any feature in one aspect may be applied to other aspects, in any appropriate combination. In particular, method aspects may be applied to system aspects, and vice versa. Furthermore, any, some, and/or all features in one aspect can be applied to any, some, and/or all features in any other aspect, in any appropriate combination. It should also be appreciated that particular combinations of the various features described and defined in any aspect can be implemented and/or supplied and/or used independently.

The invention claimed is:

1. A method of selecting a battery control strategy for a hybrid battery of a hybrid electric vehicle, the method comprising:
   receiving forecast weather information for a first location;
   determining an operational parameter of the hybrid battery;
   selecting a first battery control strategy based on the forecast weather information and the operational parameter of the hybrid battery, wherein the first battery control strategy comprises a state of charge target for the hybrid battery required for a next start sequence;
   assigning a priority score for a plurality of hybrid vehicle functions based on the forecast weather information; and
   selecting a second battery control strategy based on the hybrid vehicle function with the highest priority, the second battery control strategy to be used when the state of charge target of the first battery control strategy has been reached.

2. The method of claim 1, wherein determining the operation parameter of the hybrid battery comprises at least one of: determining if a battery state of charge is less than a predetermined threshold; determining if the forecast weather information is in a cold start weather range; and determining if a battery state health is less than a predetermined threshold.

3. The method of claim 2, wherein the cold start weather range is from −10° C. to 0° C.

4. The method of claim 2, wherein the predetermined threshold for the battery health is 65%.

5. The method of claim 1, wherein the operational parameter is battery state of health data.

6. The method of claim 1, wherein the first location is a current location of the hybrid electric vehicle.

7. The method of claim 1, wherein the first location is a future location of the hybrid electric vehicle, based on navigation data or historic trip data.

8. The method of claim 1, further comprising:
   determining if a vehicle navigation system has been programmed for a trip; and
   determining if the remaining trip distance is greater than a first threshold.

9. The method of claim 8, wherein the first threshold is a distance required to charge the hybrid battery to enable one or more hybrid vehicle functions.

10. The method of claim 9, further comprising predicting hybrid electric vehicle function usage data for a current trip.

11. The method of claim 10, wherein the prediction is based on one or more of: vehicle data, navigation data, GPS data, ADAS; traffic sign recognition, cruise control system, driver inputs, or historic route information.

12. The method of claim 8, further comprising:
determining if capability of the hybrid battery is to be limited at the next start; and
harvesting energy for the remaining trip distance to enable one or more start sequences based on the determination of the capability of the hybrid battery.

13. The method of claim 1, wherein the operational parameter comprises at least one of:
current ambient temperature,
a state of charge of the hybrid battery of the hybrid electric vehicle,
a time since a last engine start-up,
battery age data,
further weather forecast data,
navigation data, or
a delta temperature between the temperature of an aftertreatment system and the current ambient temperature.

14. The method of claim 1, further comprising updating the first battery control strategy with an over the air update.

15. The method of claim 1, further comprising:
detecting a regenerative braking event;
harvesting energy from the regenerative braking event; and
after the regenerative braking event, selecting a new battery control strategy based on the amount of harvesting energy from the regenerative braking event.

16. A method of selecting a battery control strategy for a hybrid battery of a hybrid electric vehicle, the method comprising:
receiving forecast weather information for a first location;
determining an operational parameter of the hybrid battery; and
selecting a first battery control strategy based on the forecast weather information and the operational parameter of the hybrid battery, wherein the first battery control strategy comprises a state of charge target for the hybrid battery required for a next start sequence, wherein at least one of a plurality of heating elements of a heating module is selectively operated to provide heat to a catalyst;
wherein the catalyst is heated to a threshold temperature based on the operational parameter; and
after the catalyst reaches the threshold temperature, starting an engine of the hybrid electric vehicle.

17. A vehicle comprising a hybrid battery electrically connected to a hybrid engine, the hybrid battery and the hybrid engine communicatively coupled to a controller, the controller configured to:
receive forecast weather information at a first location;
determine an operational parameter of the hybrid battery;
select a first battery control strategy based on the forecast weather information and the operational parameter of the hybrid battery, wherein the first battery control strategy comprises a state of charge target for the hybrid battery required for a next start sequence;
assign a priority score for a plurality of hybrid vehicle functions based on the forecast weather information; and
select a second battery control strategy based on the hybrid vehicle function with the highest priority, the second battery control strategy to be used when the state of charge target of the first battery control strategy has been reached.

* * * * *